US012558646B2

(12) United States Patent
Hedlund et al.

(10) Patent No.: US 12,558,646 B2
(45) Date of Patent: Feb. 24, 2026

(54) AIR FILTRATION CASSETTE, AN AIR FILTER AND A FILTER ARRANGEMENT

(71) Applicant: Camfil Aktiebolag, Stockholm (SE)

(72) Inventors: Kenny Hedlund, Trosa (SE); Vincent Arun Kenadzir, Chemor Perak (SE); Christian Lindahl, Hägersten (SE); Mageshvaran Muthu Krisnan, Trosa (SE); Mathieu Hugues, Vagnhärad (SE)

(73) Assignee: CAMFIL AKTIEBOLAG, Stockholm (SE)

( * ) Notice: Subject to any disclaimer, the term of this patent is extended or adjusted under 35 U.S.C. 154(b) by 332 days.

(21) Appl. No.: 18/039,062

(22) PCT Filed: Nov. 19, 2021

(86) PCT No.: PCT/SE2021/051156
§ 371 (c)(1),
(2) Date: May 26, 2023

(87) PCT Pub. No.: WO2022/119489
PCT Pub. Date: Jun. 9, 2022

(65) Prior Publication Data
US 2024/0001276 A1      Jan. 4, 2024

(30) Foreign Application Priority Data
Dec. 3, 2020      (SE) .................................... 2051415-4

(51) Int. Cl.
*B01D 53/04*       (2006.01)
*B01D 46/00*       (2022.01)
*B01D 46/24*       (2006.01)
(52) U.S. Cl.
CPC ..... *B01D 53/0431* (2013.01); *B01D 46/0036* (2013.01); *B01D 46/2403* (2013.01);
(Continued)

(58) Field of Classification Search
None
See application file for complete search history.

(56) References Cited

U.S. PATENT DOCUMENTS

| | | | |
|---|---|---|---|
| 1,899,993 A | 3/1933 | Spencer | |
| 3,926,599 A | 12/1975 | Rudin et al. | |

(Continued)

FOREIGN PATENT DOCUMENTS

| | | |
|---|---|---|
| CN | 102985157 A | 3/2013 |
| CN | 204563790 U | 8/2015 |

(Continued)

OTHER PUBLICATIONS

JPS55134616A_ENG_manual (Manual machine translation of Baelz) (Year: 1980).*

(Continued)

*Primary Examiner* — Gabriel E Gitman
(74) *Attorney, Agent, or Firm* — McDonald Hopkins LLC

(57) ABSTRACT

An air filtration cassette extending in a length direction between a first end and a second end, related to an intended air flow direction from the first end to the second end during use, the air filtration cassette comprising a filter material disposed between an outer boundary surface and an inner boundary surface, the air filtration cassette having an interior open space encompassed by the inner boundary surface and the filter material, and having an opening arranged at one end of the open space and being closed at the other end thereof, an average distance between said inner boundary surface and said outer boundary surface at said second end being larger than an average distance between said inner boundary and said outer boundary at said first end, the average distance between said inner boundary surface and said outer boundary surface being the average of all distances between the inner boundary surface and the outer boundary surface in a direction perpendicular to said length (Continued)

direction at a selected position along the length of the air filtration cassette; an air filter and a filter arrangement.

15 Claims, 5 Drawing Sheets

(52) U.S. Cl.
CPC .... *B01D 2267/30* (2013.01); *B01D 2275/201* (2013.01); *B01D 2275/205* (2013.01)

(56) References Cited

U.S. PATENT DOCUMENTS

| | | | |
|---|---|---|---|
| 3,969,095 A * | 7/1976 | Kurahashi | B01D 53/0431 |
| | | | 55/517 |
| 4,129,429 A | 12/1978 | Humbert et al. | |
| 5,554,203 A | 9/1996 | Borkent et al. | |
| 7,708,795 B2 | 5/2010 | Westlund | |
| 8,562,701 B2 * | 10/2013 | Heidenreich | B01D 46/2407 |
| | | | 48/197 R |
| 2012/0102706 A1 | 5/2012 | Gallagher et al. | |
| 2013/0062276 A1 | 3/2013 | Barreteau et al. | |
| 2014/0137743 A1 | 5/2014 | Reeh | |
| 2014/0144112 A1 * | 5/2014 | Campbell | B01D 46/2411 |
| | | | 55/482 |
| 2015/0267653 A1 | 9/2015 | Kinsey | |
| 2022/0054971 A1 * | 2/2022 | Bellio | F26B 25/006 |

FOREIGN PATENT DOCUMENTS

| | | | |
|---|---|---|---|
| CN | 1688799 A | | 10/2015 |
| DE | 836344 C | | 4/1952 |
| DE | 102016102309 A1 | | 8/2017 |
| EP | 0501281 A2 | | 9/1992 |
| EP | 1905497 A1 | | 4/2008 |
| FR | 2879236 A1 | | 6/2006 |
| JP | S5047072 U | | 5/1975 |
| JP | S55134616 A | * | 10/1980 |
| WO | 2019197055 A1 | | 10/2019 |

OTHER PUBLICATIONS

Extended European Search Report for Application 21901141.8, PCT/SE2021/051156 dated Jul. 22, 2024, 7 pgs., European Patent Office, Germany.

Office Action for Application 21901141.8, PCT/SE2021/051156 dated Apr. 2, 2025, 4 pgs., European Patent Office, Germany.

Patent Cooperation Treaty (PCT), International Search Report and Written Opinion for Application PCT/SE2021/051156 filed Nov. 19, 2021, mailed Dec. 9, 2021, International Searching Authority, SE.

Action dated Oct. 16, 2025; Japanese Patent Application No. 2023-528103. 11 pages.

* cited by examiner

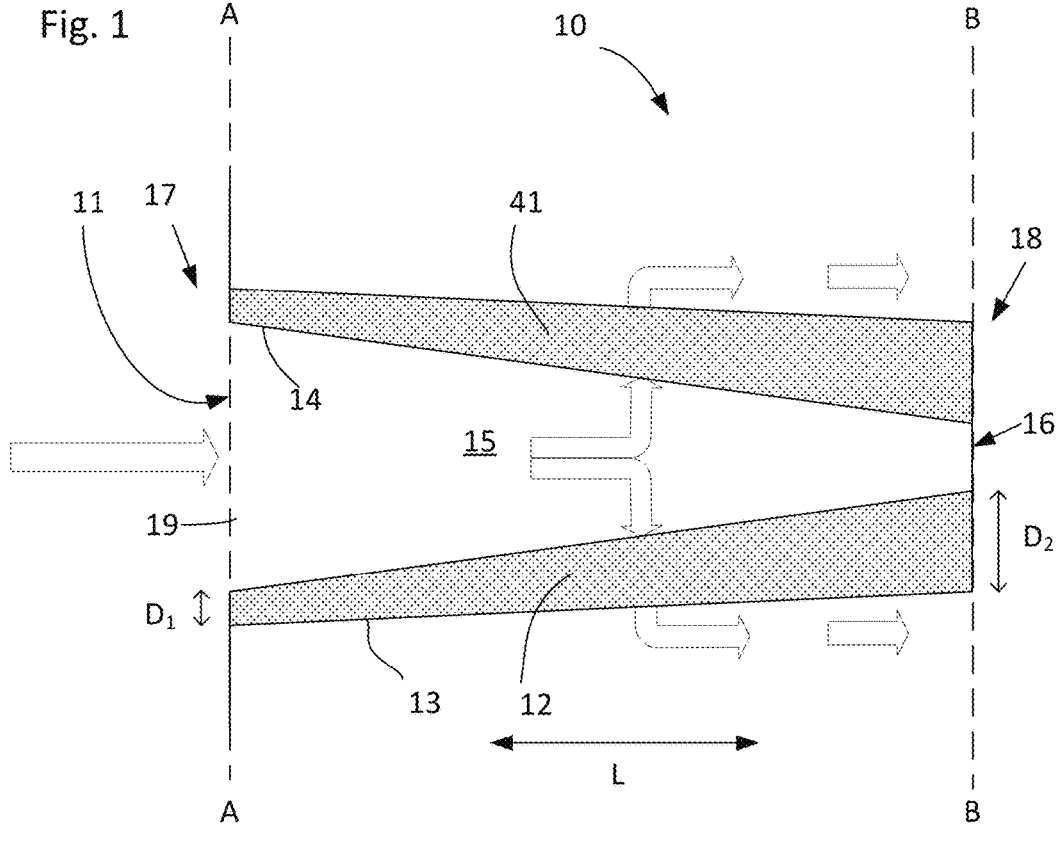
Fig. 1
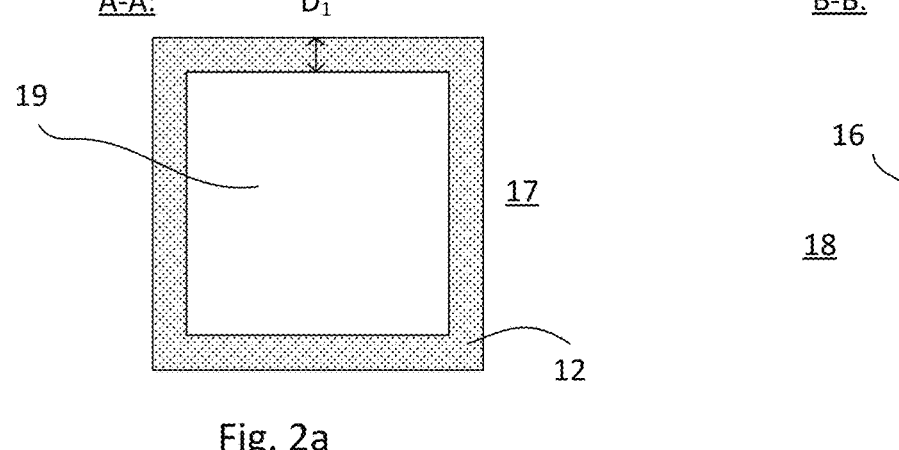
Fig. 2a
Fig. 2b

Fig. 3
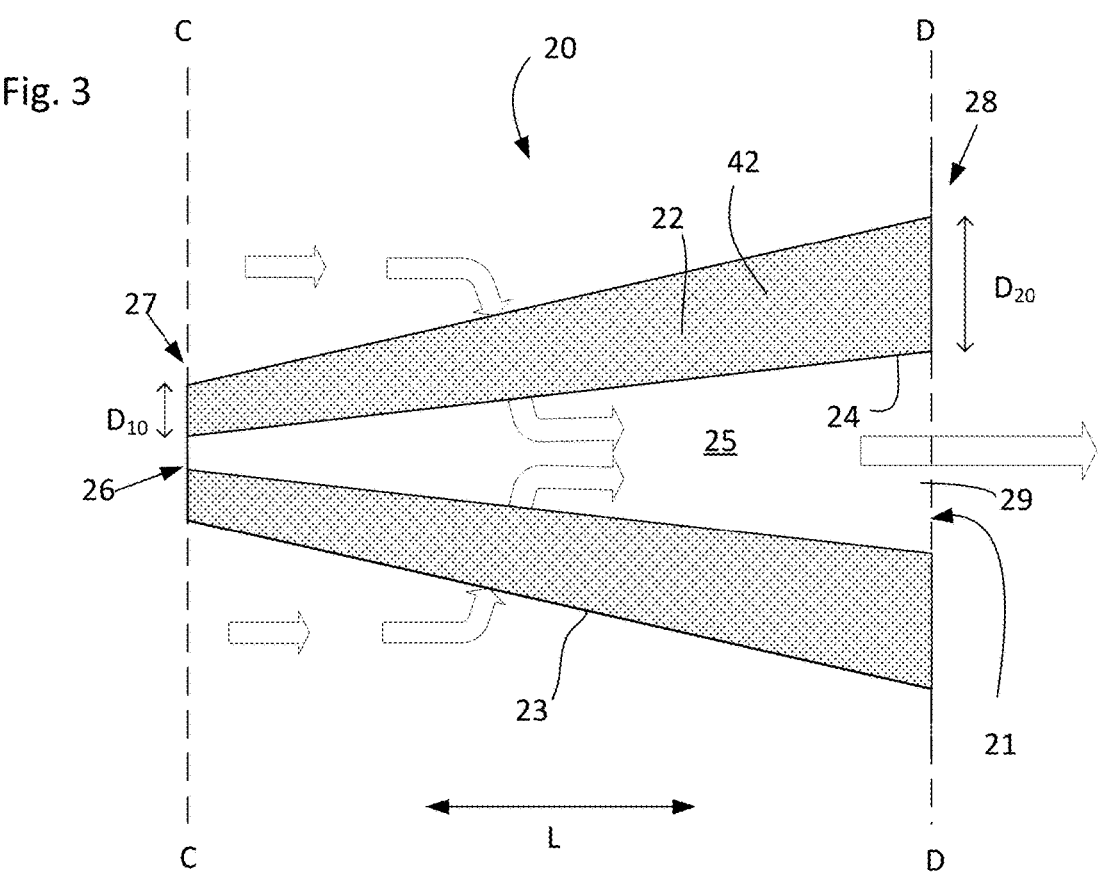
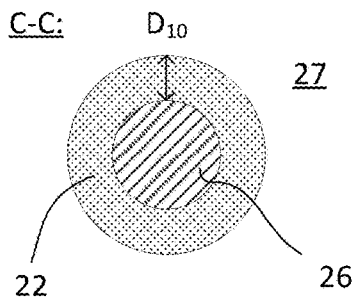
C-C:
Fig. 4a
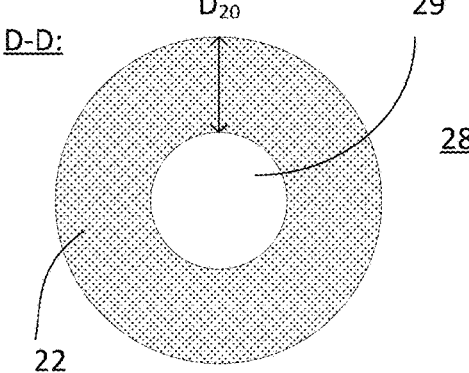
D-D:
Fig. 4b

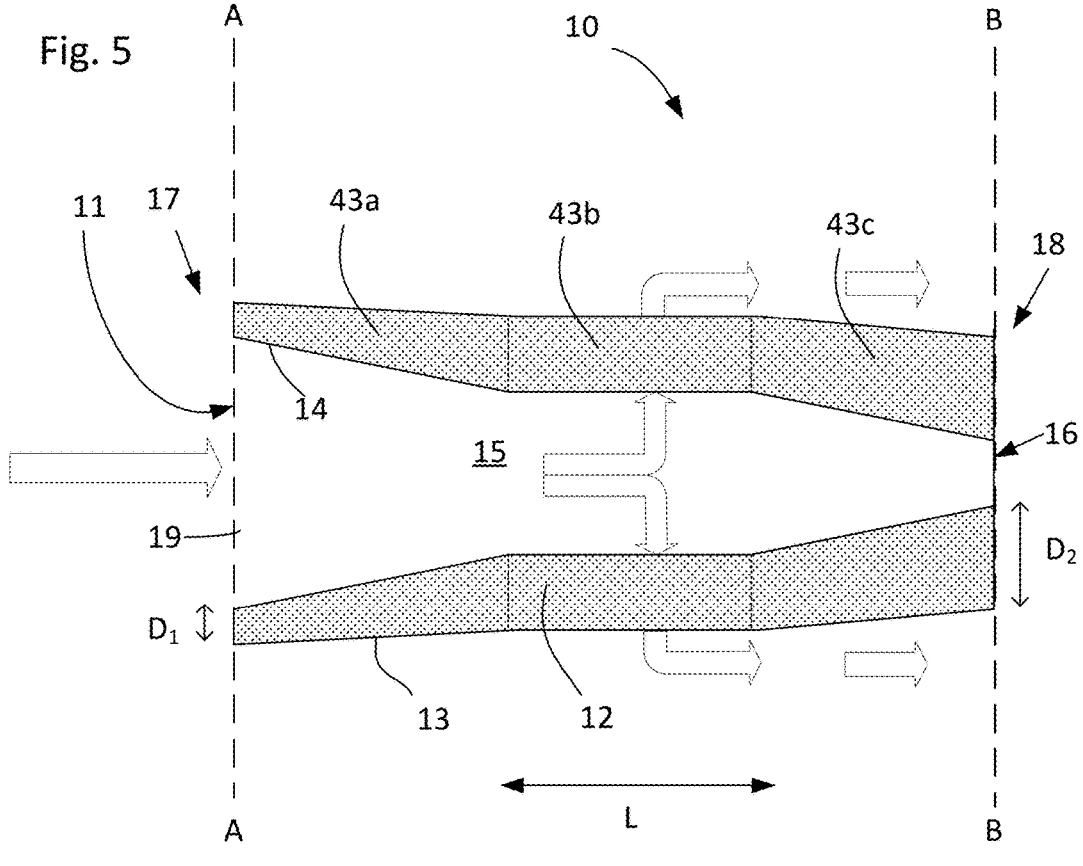
Fig. 5
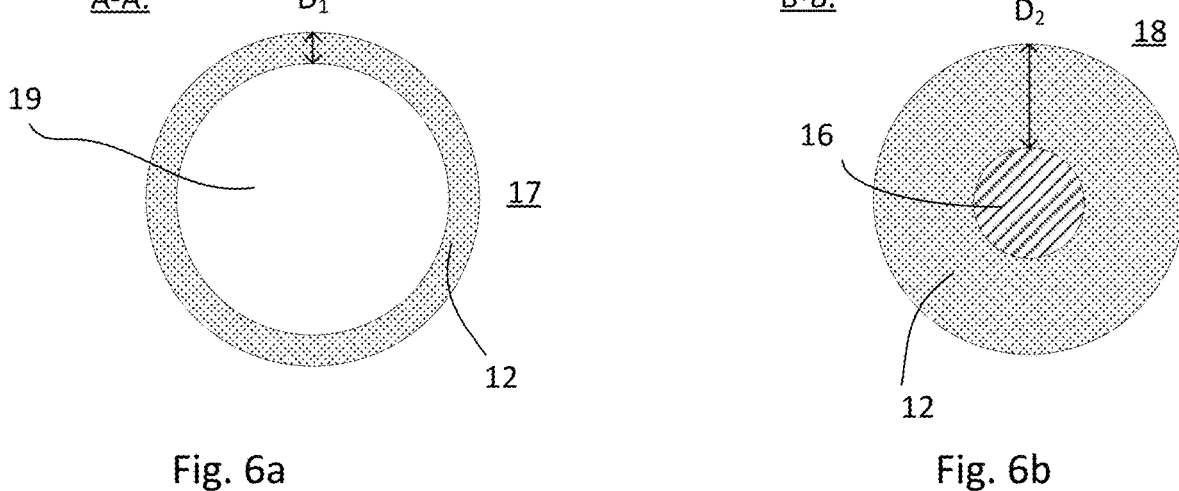
Fig. 6a                           Fig. 6b

Fig. 7
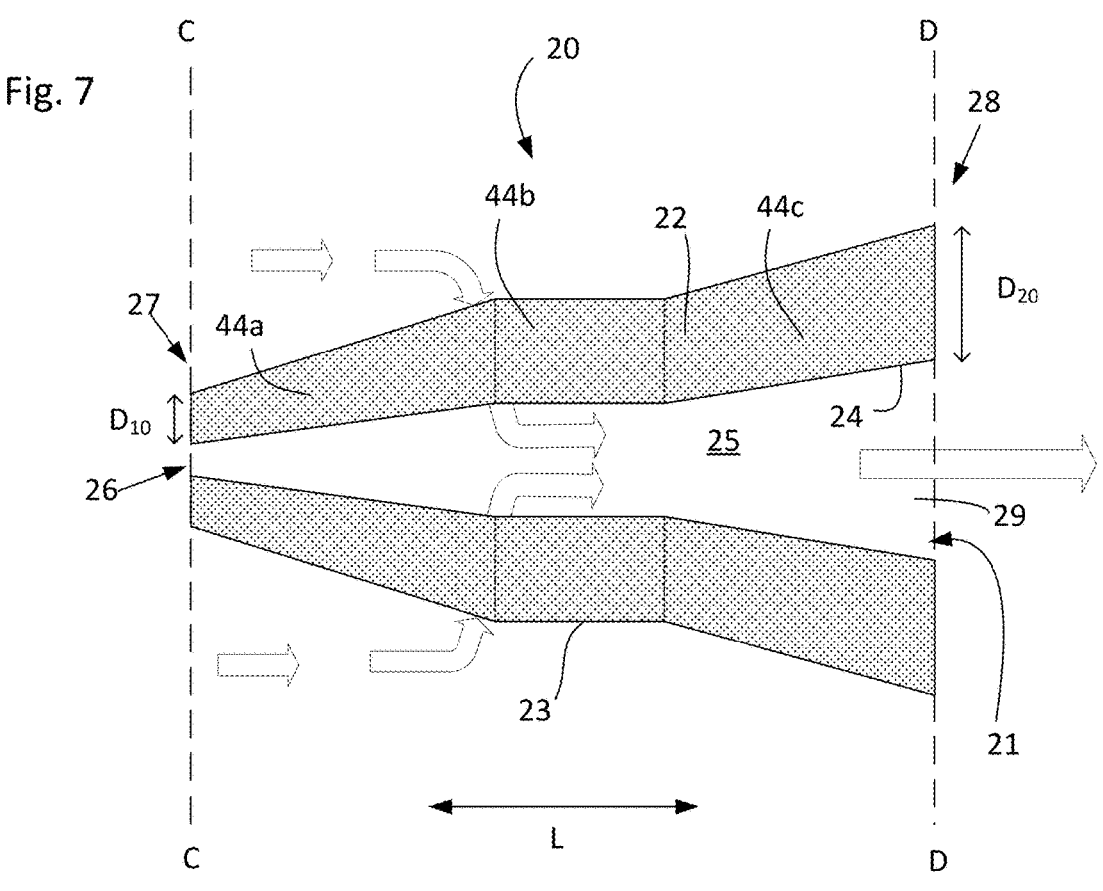
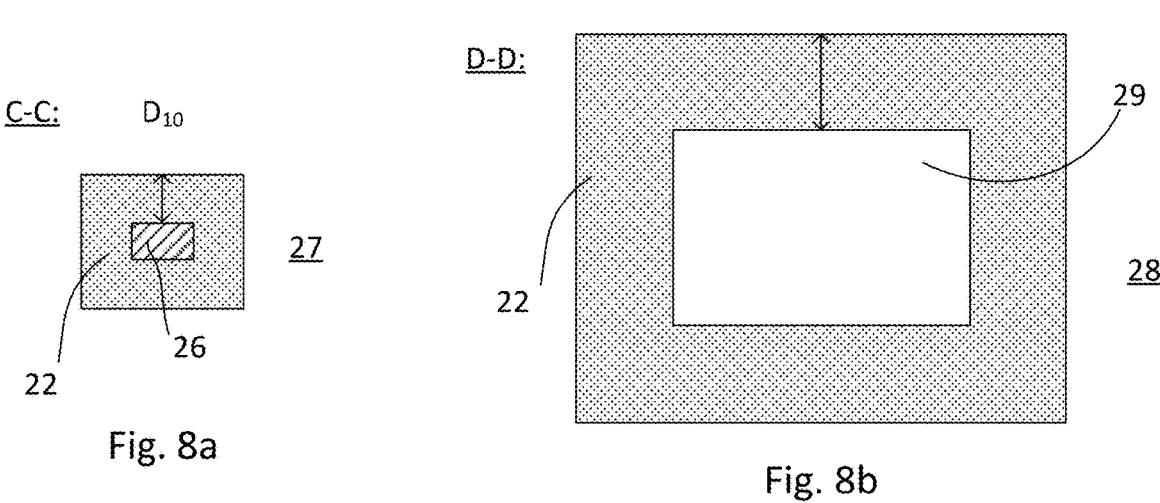
C-C:
Fig. 8a
D-D:
Fig. 8b

AIR FILTRATION CASSETTE, AN AIR FILTER AND A FILTER ARRANGEMENT

CROSS-REFERENCE TO RELATED APPLICATION

This application is a 35 U.S.C. § 371 national stage application of PCT Application No. PCT/SE2021/051156 filed on Nov. 19, 2021 entitled "An air filtration cassette, an air filter and a filter arrangement," which claims priority to Sweden Patent Application No. 2051415-4 filed on Dec. 3, 2020, each of which are incorporated herein in their entirety by reference.

TECHNICAL FIELD

The present disclosure relates to an air filtration cassette, an air filter and a filter arrangement suitable for use in removal of contaminants in an air flow.

BACKGROUND

In many industrial applications, there is a need of removing contaminations in the form of molecules, gases, vapours or particles from an airflow, in order to provide clean air to industrial facilities and working spaces, or to remove contaminants from air exiting such locations. Removal of contaminants is typically achieved by letting an airflow pass through filters comprising filter material having properties selected with regard to the requirements of contamination. Such filters can contain a plurality of tube shaped filter units attached to a vertical wall, where the filter units include a double-walled tube comprising the filter material. Document U.S. Pat. No. 7,708,795B2 shows an example of such an air filter.

SUMMARY

It is an object of the present disclosure to provide an air filtration cassette, which enables effective utilisation of filter material and increased operation service life.

Thus, according to the present disclosure, an air filtration cassette is provided extending in a length direction between a first end and a second end, related to an intended air flow direction from the first end to the second end during use. The air filtration cassette comprises a filter material disposed between an outer boundary surface and an inner boundary surface, and the air filtration cassette has an interior open space encompassed by the inner boundary surface and the filter material, and has an opening arranged at one end of the open space and being closed at the other end thereof.

An average distance between the inner boundary surface and the outer boundary surface at the second end of the cassette is larger than an average distance between the inner boundary and the outer boundary at the first end of the cassette. By the terms "at the first end" and "at the second end" is meant positions at the outermost portion or near the outermost portion, preferably a position located within the 10% of the total length of the air filtration cassette closest to the first and second end, respectively. Accordingly, the largest average distance between the inner and outer boundary surfaces is preferably located at a position at the outermost portion of the second end of the air filtration cassette, and in the same way, the smallest distance between the inner and outer boundary surfaces is preferably located at a position at the outermost portion of the first end of the air filtration cassette, while it could also be contemplated that the distance between the boundary surfaces changes at one or both of the outermost portions of said first and second end of the air filtration cassette so that the distance decreases outward of the largest distance and/or increases outward of the smallest distance between the boundary surfaces.

The average distance between the inner boundary surface and the outer boundary surface is the average of all distances between the inner boundary surface and the outer boundary surface in a direction perpendicular to the length direction at any selected position along the length of the air filtration cassette. By providing a greater distance between the boundary surfaces at the second end of the cassette than at the first end, the thickness of the filter material disposed between the boundary surfaces can be greater at the second end, which allows for improved filtering efficiency.

The average distance between the inner boundary surface and the outer boundary surface may suitably change continuously along the length direction between the first end and the second end of the air filtration cassette, or alternatively, this average distance may change stepwise along the length direction between the first end and the second end; or a combination thereof.

The inner boundary surface and the outer boundary surface may suitably have the same cross-sectional shape at each cross-section along the length direction, said cross-section being perpendicular to the length direction.

Advantageously, at least one of said outer boundary surface and said inner boundary surface may have the shape of a cone or pyramid or a frustum thereof, or may comprise a number of consecutive sections having the shape of a cone or pyramid or a frustum thereof or the shape of a cylinder or parallelepiped.

The outer boundary surface may preferably delimit a cone or pyramid shape or a frustum thereof, and preferably has an inclination angle of 1-10° with respect to a longitudinal central axis of the air filtration cassette, and the said inner boundary surface may preferably delimit a cone or pyramid shape or a frustum thereof, and preferably has an inclination angle of 1-10° with respect to a longitudinal central axis if the air filtration cassette.

According to one preferred embodiment, both of said outer boundary surface and said inner boundary surface delimit a cone shape or pyramid shape or a frustum thereof, and the inner boundary surface tapers more toward the second end than the outer boundary surface. The average distance between said inner boundary surface and said outer boundary surface at said second end may then be at least 10% larger than the average distance between said inner boundary and said outer boundary at said first end.

According to another preferred embodiment, both of said outer boundary surface and said inner boundary surface delimit a cone shape or pyramid shape or a frustum thereof, and the inner boundary surface tapers less toward the first end than the outer boundary surface. The average distance between said inner boundary surface and said outer boundary surface at said second end may then be at least 10% larger than the average distance between said inner boundary and said outer boundary at said first end.

The inner and outer boundary surfaces may suitably be comprised of an air permeable structure, preferably made of mesh or grid material, suitably made of plastic material or metal.

The filter material may suitably be a bed of air filter media, preferably in the form granules, spheres or pellets, said air filter media preferably being an adsorbent material for removal of gaseous contaminants or vapour contaminants.

The maximum diameter of the outer boundary surface may suitably be 80-200 mm, more preferably 130-160 mm, and the length of the air filtration cassette from the first end to the second end is preferably 150-800 mm, more preferably 230-650 mm.

The present disclosure also relates to an air filter comprising a baseplate and one or more air filtration cassettes as described above, wherein the baseplate has one or more openings and the one or more air filtration cassettes are mounted to the baseplate so that the opening of each air filtration cassette corresponds to an opening of the baseplate. The air filter may suitably comprise a plurality of air filtration cassettes arranged adjacent to each other in rows, preferably in 3-6 rows where each row preferably contains 3-6 air filtration cassettes.

The present disclosure also relates to a filter arrangement comprising one or more air filters as described above, wherein the air filters are mounted so that the air filtration cassettes extend in a substantially horizontal direction. The filter arrangement may further comprise a filter housing having an opening adapted to receive the baseplate of the one or more air filters wherein the filter arrangement is arranged in the filter housing so that the air filtration cassettes are located within the housing. Another opening is arranged in the housing on the opposite side from the opening receiving the filter base plate, so that the air can flow through the filter when installed in the housing. A door can be provided so that the filter and the air filtration cassettes are accessible and can be removed or replaced as desired.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

BRIEF DESCRIPTIONS OF THE DRAWINGS

The above objects, as well as additional objects, features and advantages of the present disclosure will be more fully appreciated by reference to the following illustrative and non-limiting detailed description of example embodiments of the present disclosure, when taken in conjunction with the accompanying drawings.

FIG. 1 is a schematic cross-sectional view of an air filtration cassette according to a first embodiment of the present disclosure;

FIGS. 2a and 2b are schematic views along the lines A-A and B-B of FIG. 1, respectively;

FIG. 3 is a schematic cross-sectional view of an air filtration cassette according to a second embodiment of the present disclosure;

FIGS. 4a and 4b are schematic views along the lines C-C and D-D of FIG. 3, respectively;

FIG. 5 is a schematic cross-sectional view of an air filtration cassette according to a variant of the first embodiment of the present disclosure shown in FIG. 1;

FIGS. 6a and 6b are schematic views along the lines A-A and B-B of FIG. 5, respectively;

FIG. 7 is a schematic cross-sectional view of an air filtration cassette according to a variant of second embodiment of the present disclosure shown in FIG. 3;

FIGS. 8a and 8b are schematic views along the lines C-C and D-D of FIG. 7, respectively;

DETAILED DESCRIPTION

Figures 9, 10, 11:
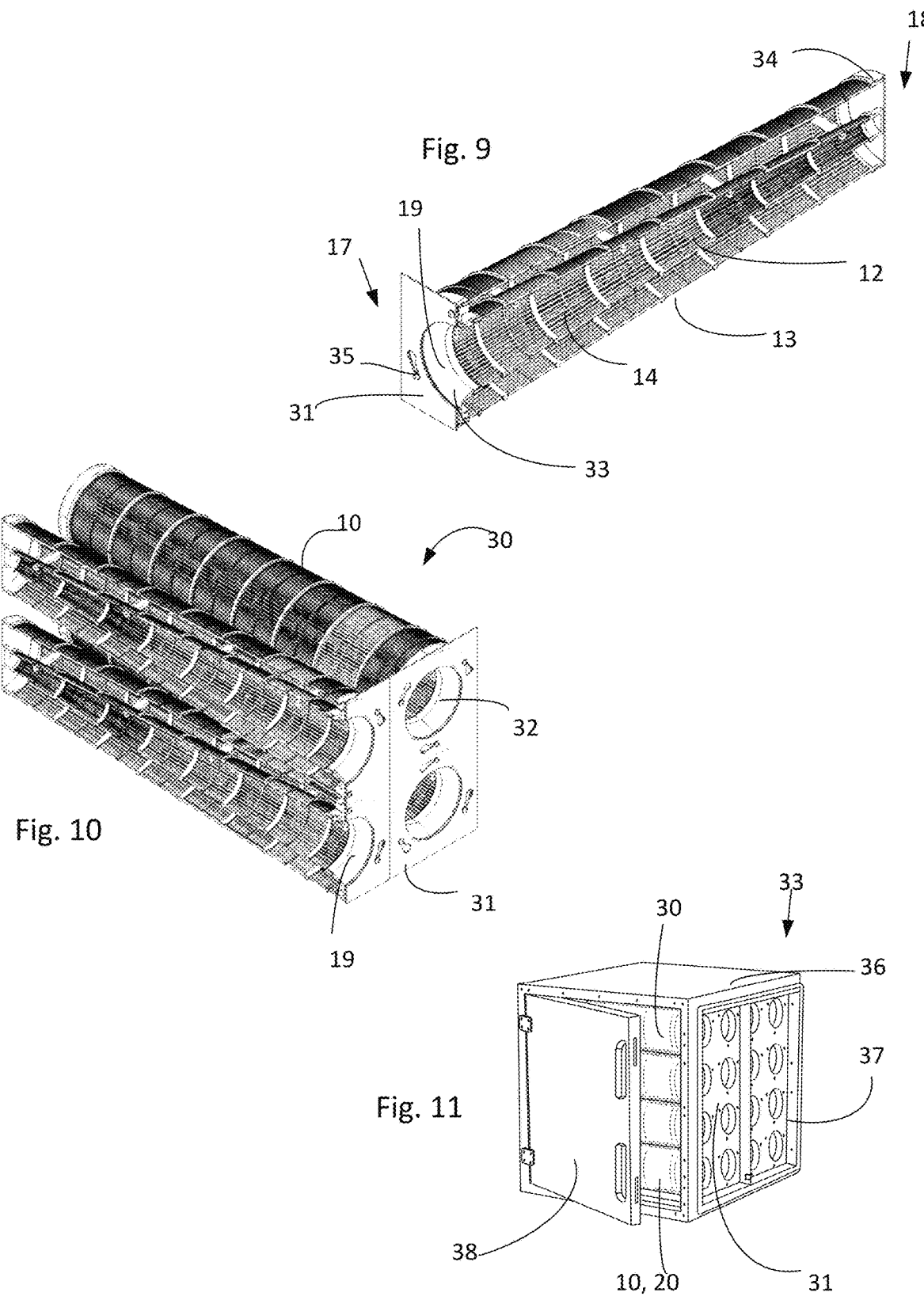
FIG. 9 is a cross-sectional perspective view of an air filtration cassette according to the first embodiment.
FIG. 10 is a cross-sectional perspective view of a filter including air filtration cassettes according to the first embodiment.
FIG. 11 is a perspective view of filter arrangement including a filter according to the present disclosure.

Thus, according to the present disclosure, there is provided an air filtration cassette extending in a length direction between a first end and a second end, related to an intended air flow direction from the first end to the second end during use.

The air filtration cassette comprises a filter material disposed between an outer boundary surface and an inner boundary surface. Accordingly, a tubular filter material volume is formed between the outer and inner boundary surfaces, which filter material volume is preferably closed at its end sections at the first and second ends of the air filtration cassette, for example by means of caps. An interior open space is encompassed by the inner boundary surface and the filter material and has an opening arranged at one end of the open space and being closed at the other end thereof. Accordingly, the air filtration cassette can be described as having an open end at the opening of the interior open space and a closed end at the opposite end in the length direction. The closed end of the interior open space may be sealed by an end cap. The end cap sealing the closed end of the interior open space can be arranged to seal the end of the air filtration cassette so that also the end portion of the filter material volume is closed.

In use, the air filtration cassette will advantageously be mounted in a filter, in such a way that an airflow passing the air filtration cassette will be forced to pass through the filter material due to the closed end of the interior open space, and the optionally closed end of the filter material volume. This can be achieved by mounting the air filtration cassette to a base plate or wall that prevents the air flow from by-passing the air filtration cassette. A mounting plate may be attached at the open end of the air filtration cassette, including a sealing gasket if desired. The air filtration cassette is preferably releasably mounted to the base plate of a filter, for example by an attachment arrangement, which can be in the form of a protruding element disposed to mate a corresponding receiving opening the base plate.

In a first embodiment of the present disclosure, the air to be filtered is intended to flow in a direction from the opening of the interior open space toward the closed end of the air filtration cassette and out through the filter material.

In a second embodiment of the present disclosure, the air to be filtered is intended to flow in a direction from the closed end of the air filtration cassette and out through the filter material toward the opening of the interior open space.

As will be described in more detail below, an air filter arrangement is provided in which a plurality of air filtration cassettes can be attached to a base plate having air flow openings corresponding to the opening at one end of the open space inside the air filtration cassettes. The base plate will admit passage of air flow only through the openings. The air filtration cassettes will extend in a direction substantially perpendicular to the baseplate, and will be arranged adjacent to each other in rows. The air filter arrangement will be open at the opposite end and there will be some free space between the adjacent air filtration cassettes.

The average distance between the inner boundary surface and the outer boundary surface at the second end of the air filtration cassette is larger than the average distance between the inner boundary and the outer boundary at the first end of the air filtration cassette. The average distance between the inner boundary surface and the outer boundary surface is the average of all distances between the inner boundary surface and the outer boundary surface, in a radial direction perpendicular to the length direction at a certain position along the length of the air filtration cassette. This means that the distance between the inner boundary surface and the outer boundary surface can be the same everywhere around circumference, which would be the case if both the inner and outer boundary surfaces have the same cross-sectional shape and are circular or oval for example, or; if the boundary surfaces have the same cross-sectional shape and are formed with corners or the like, of have different cross-sectional shapes from each other. The cross-sectional shapes of the inner and outer boundary surfaces may vary along the outer boundary surface, and the cross-sectional shape of the inner boundary surface may be different from the cross-sectional shape of the outer boundary surface at certain cross-section positions along the length of the air filtration cassette. Therefore, the distance between the inner and outer boundary surfaces is expressed as an average distance between the outer and inner boundary surfaces. In the following, for the sake of simplicity, the term "distance" will be used to denote "average distance", unless otherwise indicated.

The distance between the inner boundary surface and the outer boundary surface decreases from the first end of the air filtration cassette to the second end thereof, i.e. the distance increases in the intended air flow direction, so that the filter material has a greater thickness at the air outlet end of the air filtration cassette.

Thus, the distance between the inner boundary surface and the outer boundary indicates the space available for filter material to be arranged in the air filtration cassette, between the inner and outer boundary surfaces, and thus corresponds to the filter material thickness at a certain cross-section of the air filter cassette. By providing a greater distance between the boundary surfaces at the second end of the cassette than at the first end, the thickness of the filter material arranged between the boundary surfaces can be greater at the second end than at the first end.

Increased filter material thickness typically leads to increased pressure drop and the air flow velocity through the filter material will decrease, leading to an increased contact time between the air and the filter material. This can thus mitigate an uneven air flow velocity through the filter material that may otherwise typically be a problem in air filtration cassettes having a cylindrical outside. Accordingly, by providing increased filter material thickness at the air outlet end, the air filtration cassette can be dimensioned so that the contact time for the filter material can be more uniform throughout the air filtration cassette. Thereby, the filtering capacity of the filter material will be depleted more evenly over the air filtration cassette, and the filter material can thus be more effectively utilised which will increase the effective service life of the air filtration cassette, or use less filter material with maintained service life.

The maximum diameter of the outer boundary surface may suitably be in the range 50-200 mm, preferably 130-160 mm. By maximum diameter is meant the diameter of the air filtration cassette at its largest point. In case the outer boundary surface has a varying diameter along its circumference, an average maximum diameter will replace the mentioned maximum diameter. The average diameter of the outer boundary surface is the average of all diameters of a cross-section in a plane perpendicular to the length direction of the air filtration cassette. The minimum diameter of the outer boundary surface, i.e. the smallest diameter of the air filtration cassette may suitably be 40-150 mm. The length of the air filtration cassette from the first end to the second end is preferably 150-800 mm, more preferably 230-650 mm.

The inner and outer boundary surfaces may suitably be comprised of an air permeable structure, preferably made of mesh or grid material, suitably made of plastic material, such as PP, or metal, such as aluminium or steel. In case a very fine-grained filter media is used, a woven or nonwoven lining can be used to prevent the filter media from falling out.

The distance between said inner boundary surface and said outer boundary surface changes continuously along the length direction of the air filtration cassette between said first end and said second end; or changes stepwise along the length direction of the air filtration cassette between said first end and said second end; or a combination thereof.

The cross-sectional shape of the volume formed between the outer and inner boundary surfaces depends on the cross-sectional shape of inner and outer boundary surfaces at a certain cross-section. The inner and outer boundary surfaces can have any cross-sectional shape, and are preferably symmetric about at least one plane, such as circular, oval, square, rectangular, hexagonal, octagonal shape. The inner boundary surface may preferably have the same cross-sectional shape as the outer boundary surface at each cross-section along the length direction. Thereby, the distance between the inner and outer boundary surfaces will be substantially the same as the actual distance between the inner and outer boundary surfaces in each radial position around the circumference of the inner and outer boundary surfaces, resulting in an even filter material thickness in the radial direction at a given section along the length of the air filtration cassette, and consequently in a uniform airflow in the radial direction through the filter material.

The filter material may suitably be a bed of air filter media, preferably in the form granules, spheres or pellets, which may have a size of 1-6 mm (granules), 1-6 mm (pellets) or 1-6 mm (sphere diameter). The air filter media is preferably an adsorbent material for removal of gaseous contaminants or vapour contaminants, such as activated carbon or activated alumina. The filter material can also be particle filter material. The air filtration cassette may comprise 0.6-6 liters of filter media.

The filter material can be a sintered body of granules, spheres or pellets, and if so the above-mentioned air permeable structure may not be needed, as the filter material will be self-supporting.

The inner boundary surface and the outer boundary surface may suitably have the same cross-sectional shape at each cross-section along the length direction, which may facilitate manufacture and assembly of the air filtration cassette.

At least one of the outer boundary surface and the inner boundary surface may preferably have the shape of a cone or pyramid or a frustum thereof, thereby facilitating the provision a larger distance between the inner and outer boundary surfaces at the second end of the air filtration cassette. Alternatively, the inner and outer boundary surfaces may comprise a number of consecutive sections, which sections can have the shape of a cone or pyramid or a frustum thereof, or the shape of a cylinder or parallelepiped, where all sections can have cone/pyramid sections, or where one or more cylinder or parallelepiped sections can be combined with one or more cone/pyramid sections.

The outer boundary surface may advantageously have a shape such that it tapers toward the closed end of the air filtration cassette, i.e. the air outlet end for the first embodiment, and the air inlet end for the second embodiment. A tapered outer surface of the cassette provides increased space available for air passage on the outside of the air filtration cassette, which can further reduce the pressure drop through the filter material. A tapered outer boundary shape can suitable be obtained by providing the outer boundary surface to have the shape of a cone or pyramid or a frustum thereof. An inclination angle of 1-10° of the outer boundary surface with respect to the longitudinal central axis of the air filtration cassette may be suitable to obtain an optimal pressure drop reduction. The inner boundary surface may preferably delimit a cone or pyramid shape or a frustum thereof, in order to allow a varying filter material thickness along the length of the air filtering cassette, so as give more uniform contact time throughout the air filtration cassette. The inclination angle may preferably be 1-10° with respect to a longitudinal central axis if the air filtration cassette.

In the first embodiment, the inner and outer boundary surfaces preferably both delimit a cone shape or pyramid shape or a frustum thereof, and in this case the inner boundary surface tapers more toward the second end (air outlet end) than the outer boundary surface. Accordingly, the thickness of the filter material disposed between the inner and outer boundary surfaces boundary surface is greater at the air outlet end than at the air inlet end. As mentioned above, in this embodiment, the air inlet end is the open end of the air filtration cassette. The distance between the inner and outer boundary surfaces at the second end (air outlet end) is preferably at least 10% larger than the distance between the inner and outer boundary surfaces at the first end (air inlet end), to obtain a uniform contact time between the air flow and the filter material regardless of where along the length of the air filtration cassette a certain part of the air flow passes. In this embodiment, the distance between the inner and outer boundary surfaces at the air outlet end may be up to three times larger than the distance at the air inlet end.

In the second embodiment, the inner and outer boundary surfaces preferably both delimit a cone shape or pyramid shape or a frustum thereof, and in this case the inner boundary surface tapers less toward the first end (air inlet end) than the outer boundary surface. As mentioned above, in this embodiment, the air inlet end is the closed end of the air filtration cassette. Accordingly, also in this embodiment, the thickness of the filter material disposed between the inner and outer boundary surfaces boundary surface is greater at the air outlet end than at the air inlet end. The distance between the inner and outer boundary surfaces at the second end (air outlet end) is preferably at least 10% larger than the distance between the inner and outer boundary surfaces at the first end (air inlet end), to obtain a uniform contact time between the air flow and the filter material regardless of where along the length of the air filtration cassette a certain part of the air flow passes. In this embodiment, the distance between the inner and outer boundary surfaces at the air inlet end may be up to three times larger than the distance at the air outlet end.

As mentioned above, the present disclosure also relates to an air filter comprising a baseplate and one or more air filtration cassettes. The baseplate can be made of plastic material or metal and has one or more openings. One or more air filtration cassettes are mounted to the baseplate so that the opening of each air filtration cassette corresponds to an opening of the baseplate. The air filter may suitably comprise a plurality of air filtration cassettes arranged adjacent to each other in rows, preferably in 3-6 rows where each row preferably contains 3-6 air filtration cassettes. For example, the air filter can comprise 16 air filtration cassettes in a 4×4 arrangement, and can have a size of approximately 600×600 mm. The baseplate is preferably designed to fit into an opening in a filter arrangement. The air filtration cassettes are preferably releasably attached to the base plate, so that they can be recycled when the adsorbent material is depleted.

The present disclosure also relates to a filter arrangement comprising one or more air filters as described above, wherein the air filters are mounted so that the air filtration cassettes extend in a substantially horizontal direction and are preferably placed in rows and columns to cover the cross sectional area of an arbitrary air duct. The filter arrangement may further also comprise a filter housing having an opening adapted to receive the baseplate of the one or more air filters wherein the filter arrangement is arranged in the filter housing so that the air filtration cassettes are located within the housing.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Example Embodiments

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

FIG. 1 is a schematic cross-sectional view of the first embodiment according to the present disclosure, and FIGS. 2a and 2b are schematic views along the lines A-A and B-B of FIG. 1, respectively. In this embodiment, the air filtration cassette 10 extends in a length direction L between a first end 17 and a second end 18, where the intended air flow direction is from the first end to the second end during use, as illustrated by the white arrows in FIG. 1. Accordingly, the air flows through the air filtration cassette in a direction from the open end, through the opening 19 of the interior open space 15, and out through the filter material 12. The filter material 12 is disposed between an outer boundary surface 13 and an inner boundary surface 14, and an interior open space 15 is encompassed by the inner boundary surface and the filter material. An opening 19 is arranged at one end 11 of the interior open space and the interior open space is closed at the other end 16 thereof. The end of the air filtration cassette can be sealed by an end cap (not shown) covering both the end of the interior open space and the end portion of the filter material. In this variant of the first embodiment, both the inner and the outer boundary surface have the shape of a square base pyramidal frustum 41 and the cross-sectional shape is the same throughout the length of the air filtration cassette. As illustrated, the distance $D_2$ between the inner boundary surface 14 and the outer boundary surface 13 at the second (air outlet) end 18 of the air filtration cassette is larger than the distance $D_1$ between the inner boundary and the outer boundary at the first (air inlet) end 17, and the inner boundary surface 14 tapers more toward the second end 18 than the outer boundary surface 13.

FIG. 3 is a schematic cross-sectional view of the second embodiment according to the present disclosure, and FIGS. 4a and 4b are schematic views along the lines C-C and D-D of FIG. 3, respectively. In this embodiment, the air filtration cassette 20 extends in a length direction L between a first end 27 and a second end 28, where the intended air flow direction is from the first end to the second end during use, as illustrated by the white arrows in FIG. 3. Accordingly, the air flows through the air filtration cassette in a direction from the closed end, through the filter material 22 and out through the opening 29 of the interior open space 25. The filter material 22 is disposed between the outer boundary surface 23 and the inner boundary surface 24, and an interior open space 25 is encompassed by the inner boundary surface and the filter material. An opening 29 is arranged at one end 21 of the interior open space and the interior open space is closed at the other end 26 thereof. The end of the air filtration cassette can be sealed by an end cap (not shown) covering both the end of the interior open space and the end portion of the filter material. In this variant of the second embodiment, both the inner and the outer boundary surface have the shape of a circular conical frustum 42 and the cross-sectional shape is the same throughout the length of the air filtration cassette. As illustrated, the distance $D_{20}$ between the inner boundary surface 24 and the outer boundary surface 23 at the second (air outlet) end 28 of the air filtration cassette is larger than the distance $D_{10}$ between the inner boundary and the outer boundary at the first (air inlet) end 27, and the inner boundary surface 24 tapers less toward the first end 27 than the outer boundary surface 23.

In the variants of the first and second embodiments illustrated in FIGS. 1-4a, 4b, the distance D2,D20 between the inner boundary surface 14,24 and the outer boundary surface 13,23 changes continuously along the length direction (L) of the air filtration cassette between said first end 17,27 and said second end 18,28, such that the inner and outer boundary surfaces have a conical or pyramid shape. In the variants of the first and second embodiments illustrated in FIGS. 5-8a, 8b, the distance D2,D20 between the inner boundary surface 14,24 and the outer boundary surface 13,23 changes stepwise along the length direction (L) of the air filtration cassette between said first end 17,27 and said second end 18,28, such that the inner and outer boundary surfaces include both sections having a conical or pyramid shape and sections having cylindrical shape.

FIGS. 6a and 6b are schematic views along the lines A-A and B-B of FIG. 5, respectively; FIG. 5 is a schematic cross-sectional view of the first embodiment according to a variant of the first embodiment of the present disclosure shown in FIG. 1, and FIGS. 6a and 6b are schematic views along the lines A-A and B-B of FIG. 5, respectively. In this embodiment, the air filtration cassette 10 extends in a length direction L between a first end 17 and a second end 18, where the intended airflow direction is from the first end to the second end during use, as illustrated by the white arrows in FIG. 5. Accordingly, the airflows through the air filtration cassette in a direction from the open end, through the opening 19 of the interior open space 15, and out through the filter material 12. The filter material 12 is disposed between an outer boundary surface 13 and an inner boundary surface 14, and an interior open space 15 is encompassed by the inner boundary surface and the filter material. An opening 19 is arranged at one end 11 of the interior open space and the interior open space is closed at the other end 16 thereof. The end of the air filtration cassette can be sealed by an end cap (not shown) covering both the end of the interior open space and the end portion of the filter material. In this variant of the first embodiment, the inner boundary surface has the same cross-sectional shape as the outer boundary surface throughout the length of the air filtration cassette, and both boundary surfaces comprise three sections along the length of the air filtrations cassette: a first section 43a having the shape of a circular conical frustum, second section 43b having circular cylindrical shape, and a third section 43c having the shape of a circular conical frustum. As illustrated, the distance $D_2$ between the inner boundary surface 14 and the outer boundary surface 13 at the second (air outlet) end 18 of the air filtration cassette is larger than the distance $D_1$ between the inner boundary and the outer boundary at the first (air inlet) end 17, and the inner boundary surface 14 tapers more toward the second end 18 than the outer boundary surface 13.

FIG. 7 is a schematic cross-sectional view of an air filtration cassette according to a variant of second embodiment of the present disclosure shown in FIG. 3, and FIGS. 8a and 8b are schematic views along the lines C-C and D-D of FIG. 3, respectively. In this embodiment, the air filtration cassette 20 extends in a length direction L between a first end 27 and a second end 28, where the intended airflow direction is from the first end to the second end during use, as illustrated by the white arrows in FIG. 7. Accordingly, the air flows through the air filtration cassette in a direction from the closed end, through the filter material 22 and out through the opening 29 of the interior open space 25. The filter material 22 is disposed between the outer boundary surface 23 and the inner boundary surface 24, and an interior open space 25 is encompassed by the inner boundary surface and the filter material. An opening 29 is arranged at one end 21 of the interior open space and the interior open space is closed at the other end 26 thereof. The end of the air filtration cassette can be sealed by an end cap (not shown) covering both the end of the interior open space and the end portion of the filter material. In this variant of the first embodiment, the inner boundary surface has the same cross-sectional shape as the outer boundary surface throughout the length of the air filtration cassette, and both boundary surfaces comprise three sections along the length of the air filtrations cassette: a first section 44a having the shape of a rectangular pyramidal frustum, second section 44b having a rectangular parallelepiped shape, and a third section 44c having the shape of a rectangular pyramidal frustum. As illustrated, the distance $D_{20}$ between the inner boundary surface 24 and the outer boundary surface 23 at the second (air outlet) end 28 of the air filtration cassette is larger than the distance $D_{10}$ between the inner boundary and the outer boundary at the first (air inlet) end 27, and the inner boundary surface 24 tapers less toward the first end 27 than the outer boundary surface 23.

FIG. 9 is a cross-sectional perspective view illustrating an air filtration cassette according to the first embodiment of the present disclosure, i.e. in which the air is intended to flow from the opening 19 at the inlet end 17 toward the closed end 18. In this example, the inner and outer boundary surfaces have a circular cross-sectional shape along the entire length or the air filtration cassette. The outer and inner boundary surfaces 13,14 are comprised of grid material, which can be made of plastic material or metal. The air filtration cassette of the second embodiment (schematically shown in FIG. 3) can of course also have the inner and outer boundary surfaces boundary surfaces made of grid material having this appearance. FIG. 9 shows how the end section of the volume between the outer and inner boundary surfaces 13,14 at the open end of the air filtration cassette is closed and sealed by means of an end cap 33. The end cap 33 includes attachment means 35 to releasably attach the air filtration cassette to the base plate 31. The end cap 34 seals the filter material volume and the interior open space at the closed end of the air filtration cassette.

FIG. 10 is a cross-sectional perspective view of a filter 30, which includes a baseplate 31 and a plurality of air filtration cassettes 10 mounted to the base plate, such that the opening 19 of each air filtration cassette 10 corresponds to an opening 32 of the baseplate. FIG. 10 illustrates air filtration cassettes according to the first embodiment, but the air filtration cassettes of the second embodiment can be mounted in the same way, with the opening of the interior open space aligned with the openings of the base plate.

FIG. 11 is a perspective view of filter arrangement 33 including a filter 30 comprising air filtration cassettes 10,20 according to the present disclose. The air filter is mounted in the filter arrangement so that the air filtration cassettes extend in a substantially horizontal direction. The filter arrangement comprises a filter housing 36 having an opening 37 adapted to on the inner side to receive the baseplate 31 of the filter and on the outer side to attach to the air duct delivering air into the housing. Further, the filter is arranged in the filter housing so that the air filtration cassettes 10,20 are located inside the housing. The housing has another opening (not shown) on the opposite side so that the filtrated air can flow out from the housing. A door 38 is provided so that the filter and the air filtration cassettes are accessible and can be removed or replaced as desired.

The person skilled in the art realises that the present disclosure is not limited to the preferred embodiments described above. The person skilled in the art further realises that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. An air filtration cassette extending in a length direction between a first end and a second end, related to an intended air flow direction from the first end to the second end during use, the air filtration cassette comprising:

a filter material disposed between an outer boundary surface and an inner boundary surface, the air filtration cassette having an interior open space encompassed by the inner boundary surface and the filter material, and having an opening arranged at one end of the open space and being closed at the other end thereof, wherein the filter material is a bed of air filter media disposed between air permeable structures forming the inner and outer boundary surfaces; or a sintered body of granules, spheres or pellets, and a distance between said inner boundary surface and said outer boundary surface at said second end is larger than a distance between said inner boundary and said outer boundary at said first end, wherein both of said outer boundary surface and said inner boundary surface delimit a cone shape or pyramid shape or a frustum thereof or comprises a number of consecutive sections having the shape of a cone or pyramid or a frustum thereof or the shape of a cylinder or parallelepiped, and said inner boundary surface tapers more toward the second end than said outer boundary surface.

2. The air filtration cassette of claim 1, wherein the average distance between said inner boundary surface and said outer boundary surface changes continuously along the length direction of the air filtration cassette between said first end and said second end; or changes stepwise along the length direction of the air filtration cassette between said first end and said second end.

3. The air filtration cassette of claim 1, wherein the inner boundary surface and the outer boundary surface have the same cross-sectional shape at each cross-section along the length direction.

4. The air filtration cassette of claim 1, wherein said outer boundary surface delimits a cone or pyramid shape or a frustum thereof, and has an inclination angle of 1-10° with respect to a longitudinal central axis of the air filtration cassette.

5. The air filtration cassette of claim 1, wherein said inner boundary surface delimits a cone or pyramid shape or a frustum thereof, and has an inclination angle of 1-10° with respect to a longitudinal central axis if the air filtration cassette.

6. The air filtration cassette of claim 1, wherein the distance between said inner boundary surface and said outer boundary surface at said second end is at least 10% larger than the distance between said inner boundary and said outer boundary at said first end.

7. The air filtration cassette of claim 1, wherein the inner and outer boundary surfaces are made of mesh or grid material.

8. The air filtration cassette of claim 7, wherein the air filter media of the filter material bed is an adsorbent material for removal of gaseous contaminants or vapor contaminants.

9. The air filtration cassette of claim 1, wherein the maximum diameter of the outer boundary surface is 50-200 mm; and the length of the cassette from the first end to the second end is 150-800 mm, and wherein the volume between the outer and inner boundary surfaces is 0.6-6 liters.

10. An air filter comprising a baseplate and one or more air filtration cassettes according to claim 1, wherein the baseplate has one or more openings and the one or more air filtration cassettes are mounted to the baseplate so that the opening of each air filtration cassette corresponds to an opening of the baseplate.

11. The air filter of claim 10, comprising a plurality of air filtration cassettes arranged adjacent to each other in rows, where each row contains 2-6 air filtration cassettes.

12. A filter arrangement comprising one or more air filters according to claim 10, wherein the one or more air filters are mounted so that the air filtration cassettes extend in a substantially horizontal or vertical direction.

13. The filter arrangement of claim 12, further comprising a filter housing having an opening adapted to receive the respective baseplate(s) of the one or more air filters wherein the filter arrangement is arranged in the filter housing so that the one or more air filtration cassettes are located within the housing.

14. The air filtration cassette of claim 1, wherein the bed of air filter media is in the form of granules, spheres or pellets.

15. The air filtration cassette of claim 1, wherein the maximum diameter of the outer boundary surface is 130-160 mm, and the length of the cassette from the first end to the second end is 230-650 mm.

* * * * *